US009320207B2

(12) United States Patent
Picard

(10) Patent No.: US 9,320,207 B2
(45) Date of Patent: Apr. 26, 2016

(54) SUBSTRATE INTENDED TO ACT AS A CULTIVATION SUPPORT AND USE FOR THE PREPARATION IN PARTICULAR OF SPORT SURFACES

(75) Inventor: Edmond-Pierre Picard, Saint Sulpice de Favières (FR)

(73) Assignee: DENDRO CONCEPT, Mauchamps (FR)

( * ) Notice: Subject to any disclaimer, the term of this patent is extended or adjusted under 35 U.S.C. 154(b) by 365 days.

(21) Appl. No.: 13/701,316

(22) PCT Filed: Jun. 1, 2011

(86) PCT No.: PCT/FR2011/000325
§ 371 (c)(1),
(2), (4) Date: Feb. 7, 2013

(87) PCT Pub. No.: WO2011/151542
PCT Pub. Date: Dec. 8, 2011

(65) Prior Publication Data
US 2013/0125460 A1    May 23, 2013

(30) Foreign Application Priority Data

Jun. 1, 2010  (FR) ...................... 10 02299

(51) Int. Cl.
*E01C 13/08* (2006.01)
*A01G 31/00* (2006.01)
*A01G 9/10* (2006.01)

(52) U.S. Cl.
CPC ................ *A01G 31/001* (2013.01); *A01G 9/10* (2013.01); *A01G 9/1086* (2013.01); *Y02P 60/216* (2015.11)

(58) Field of Classification Search
CPC ....... A01G 1/004; A01G 1/002; A01G 1/005; A01G 31/001; A01G 9/10; A01G 13/0268; A01G 13/0262; A01G 9/1086; A01C 1/044; E01C 13/08; E01C 13/083
USPC ........ 47/56, 9, 1.01 F, 1.01 R, 15, 65.9, 65.5, 47/78; 111/901
See application file for complete search history.

(56) References Cited

U.S. PATENT DOCUMENTS

| | | | | |
|---|---|---|---|---|
| 3,890,910 | A  * | 6/1975  | Angruner | 111/200 |
| 4,099,345 | A  * | 7/1978  | Loads | 47/56 |
| 4,364,197 | A  * | 12/1982 | Baron | 47/56 |
| 4,941,282 | A  * | 7/1990  | Milstein | 47/56 |
| 5,189,833 | A  * | 3/1993  | Clark | 47/56 |
| 5,199,215 | A  * | 4/1993  | Lopez | 47/56 |
| 5,205,068 | A  * | 4/1993  | Solomou | 47/56 |
| 5,224,290 | A  * | 7/1993  | Molnar et al. | 47/56 |
| 5,226,255 | A  * | 7/1993  | Robertson | 47/56 |
| 5,651,213 | A  * | 7/1997  | Egan | 47/56 |
| 6,250,010 | B1 * | 6/2001  | Behrens | 47/56 |
| 6,324,781 | B1 * | 12/2001 | Stevens | 47/9 |
| 6,601,340 | B1 * | 8/2003  | Behrens | 47/56 |
| 6,694,670 | B1 * | 2/2004  | Egan | 47/56 |
| 7,059,083 | B2 * | 6/2006  | Abitz et al. | 47/56 |
| 2003/0140553 | A1* | 7/2003 | Moore | 47/9 |
| 2003/0230027 | A1 | 12/2003 | Egan | |
| 2004/0200145 | A1* | 10/2004 | Egan | 47/56 |

FOREIGN PATENT DOCUMENTS

WO    WO 2008/155528 A1    12/2008

OTHER PUBLICATIONS

International Search Report (PCT/ISA/210) issued on Sep. 14, 2011, by the European Patent Office as the International Searching Authority for International Application No. PCT/FR2011/000325.

* cited by examiner

*Primary Examiner* — Trinh Nguyen
(74) *Attorney, Agent, or Firm* — Buchanan Ingersoll & Rooney PC

(57) ABSTRACT

A culture support substrate comprising: a first part, making up the backbone of the substrate and representing more than 70% of the total volume of the substrate, composed of particles $P_{>100\ \mu m}$ with particle size greater than 100 μm, the particles as a whole consisting of hard particles $P_{H>100}$ and/or of resilient particles $P_{R>100}$, wherein the resilient particles make up a proportion by volume PV of between 0% and 100% by volume of this first part; a second part of corpuscular components $P_{<100}$ with a particle size of less than 100 μm, and making up from 0 to 450 g/l of the substrate; a third part, making up from 0 to 200 g/l of the substrate, composed of fine fibers between 3 mm and 100 mm in length and between 5 μm and 35 μm in diameter; and a fourth part, making up from 0 to 200 g/l of the substrate.

27 Claims, No Drawings

SUBSTRATE INTENDED TO ACT AS A CULTIVATION SUPPORT AND USE FOR THE PREPARATION IN PARTICULAR OF SPORT SURFACES

The present invention relates to a substrate intended for use as a culture medium, in particular for natural turf, in particular to achieve a natural grass sports surface intended for the sports of football, rugby, or equestrian sports such as flat racing or trotting, polo, show jumping and dressage, for example.

The surface traditionally used for these numerous sports is grass, more precisely natural turf: this is recognised as the ideal surface in the summer, but has the disadvantage of being sensitive to climatic conditions and of not being able to withstand intensive use without deterioration when conditions are unfavourable, especially in case of precipitation or frost.

In order to remedy this disadvantage, one idea was to replace natural turf by artificial surfaces, and in particular synthetic turf for football or rugby and, for horse tracks, arenas and race courses, by synthetic surfaces based on sand, in particular silica sand, possibly combined with elements such as mesh, fibres, ash, ground synthetic elements, paraffin and any conceivable elements to increase the cohesion of the track or reduce its vulnerability to frost and its need for watering.

However, these surfaces present major disadvantages compared with natural turf surfaces, both ecologically and from the economic point of view, in terms of ease of use, the amenity of players and of the neighbourhood and the safety of play.

Indeed, natural turf, like all other plants, contributes to the environment by means of photosynthesis, acting as a veritable solar-powered air conditioner, by keeping the temperature of the ground at around 20° C. while the temperature of synthetic surfaces reaches 60° C. in the sun, and finally it contributes to the purification of air and water by absorbing fine dust; conversely, synthetic surfaces do not trap dirt or dust but produce them, releasing the resulting products into the environment, and they smell bad in summer and pose a recycling problem. Again, in economic terms, the price of a sports surface made of turf, in terms of life cycle cost, is advantageous due to the fact that the investment is less and it lasts longer than synthetic surfaces, which have to be changed after 10 years. Another huge advantage of turf compared with synthetic surfaces is the amenity and safety of players: first of all, turf allows the ground to be rendered firm enough to be supportive and restitute energy and thus spare the muscles of the athletes and, secondly, allows the ground to remain sufficiently flat and springy and at the same time resilient enough to dampen running and spare the joints of the athletes. So turf spares the muscles of athletes and/or animals.

Despite their disadvantages as described above in comparison with natural turf in ideal conditions, substitute surfaces for natural turf are becoming more widespread, to the detriment of the latter, with "synthetic turf" for football pitches, sand and fibres or textiles or ground-up materials for racecourses and arenas: in fact, natural turf presents the material disadvantage of not being in the right condition in all circumstances. This disadvantage is now regarded as an unacceptable handicap and outweighs all other advantages (economic, ecological and health) of natural turf in comparison with artificial surfaces.

To remedy the disadvantages of the lack of stability of turf in damp periods, it has already been proposed that numerous elements be added to substrates for growing turf and in particular meshes of plastic fibres, then coarse synthetic fibres and finally, last of all, "fine" synthetic fibres.

Just as concrete has been strengthened and reinforced by wide-mesh metal meshes (reinforced concrete) then by the addition of relatively fine synthetic fibres (with a diameter greater than or equal to 100 µm), then by fibres known as microfibres (with a diameter greater than or equal to 50 µm), in the same way, it has been proposed that fibres be added to substrates for growing grass, with strips made from polypropylene threads (such as those marketed under the registered trade mark Netlon) then by the addition of finer and finer fibres, precisely those available on the market because they are used to reinforce concrete.

Furthermore, in order to improve the resistance of a turf substitute essentially constituted of sand, it has already been proposed to incorporate fibres finer than those used in concrete. For example, it is known (document FR-2.707.03-A) that an artificial sports surface can be obtained without turf, resistant to shearing, with the aid of a mechanism similar to that of the resistance given to the ground by the roots of turf, by incorporating a dose by weight of 1 to 5‰ of fibres of fine section (5 to 20 µm) and of relatively short length (4 to 75 mm) in a substrate which is essentially sandy, having a granulometry of between 10 µm and 20 mm with a dose of between 1 and 5‰ quantity by weight.

These additions are more and more effective in "reinforcing" a substitute surface, in the same way as concrete: in fact, what is obtained is a surface which attains good performances in terms of resistance to shearing, but, unfortunately, this improvement in resistance is attained at the expense of flexibility.

In order to remedy the disadvantage of a frost-susceptible soil and also to bring greater flexibility to the surface made of turf, it has recently been proposed to add granules of cork and more particularly baked cork with coarse granulometry (>3 mm), medium granulometry (500 µm to 3 mm) and fine granulometry (<500 µm) in order to give improved characteristics of frost resistance to a culture substrate into which it is incorporated, as a result of the dual effect of the insulating character of the cork and of its resilience, which enables it to "dam in" the increased volume of water under the effect of freezing and under the effect of permeability conferred by the coarse particles of cork. At the same time, cork presents the benefit of giving the substrate lightness, flexibility and resistance to compaction by its density and its resilient character. Moreover, if the large grains improve the permeability of the substrate, the small grains of cork, which are also non-swelling, offer a great capillary water-retention capacity due to the high surface tension of the cork and of the ratio between surface and volume.

However, although the incorporation of cork enables an improvement in flexibility and good behaviour in case of frost, especially when coarse particles are added, this is done to the detriment of the substrate's cohesion and resistance to shearing, especially when coarse particles are added.

Another objective of this invention is to provide a substrate intended for use in growing, especially of natural turf, which enables a sports surface to be produced, especially of natural turf, which is acceptable for any type of sport.

Another objective of this invention is to provide such a substrate which is highly resistant, very flexible, with good drainage, frost-resistant and not affected by very heavy precipitation.

These objectives, together with others which will become apparent further on, are attained by a substrate intended for use as a culture medium, which is characterised, according to this invention, by the fact that it comprises:

a first part, constituting the skeleton of the substrate and representing more than 70% of the total volume of the substrate, composed of particles $P_{>100}$ with a granulometry greater than 100 μm, all of these particles being constituted by hard particles $P_{D>100}$ and/or resilient particles $P_{R>100}$, said resilient particles $P_{R>100}$ constituting a proportion by volume PV of between 0% and 100% by volume of this first part;

a second part of particulate elements $P_{<100}$ smaller than 100 μm, this part constituting from 0 to 450 grams per liter of said substrate;

a third part, constituting from 0 to 200 grams per liter of said substrate, composed of fine fibres of a length between 3 mm and 100 mm and a diameter of between 5 μm and 35 μm;

a fourth part, constituting from 0 to 200 grams per liter of said substrate, composed of other elongated and/or surface inclusions, each of these elongated or surface inclusions having at least one of their dimensions a great deal larger than the granulometry of the particles of the first part, and the sum of the doses of the third part and of the fourth part being more than 0.5 grams per liter of said substrate.

Preferably, all of the particles of a dimension of over 180 μm or less than 100 μm represent less than 1000 grams per liter of substrate.

According to a first embodiment of this invention, for a proportion by volume PV of resilient particles $P_{R>100}$ of less than 5%, the sum of the quantity $D_F$ of the fine fibres and of the quantity $D_{AI}$ of all the other inclusions of the fourth part is more than 0.5 g/liter of substrate and 20 g/liter of substrate.

According to a second embodiment of this invention, for a proportion by volume PV of resilient particles $P_{R>100}$ of over 5% the sum of the quantity $D_F$ of fine fibres and of the quantity $D_{AI}$ of all the other inclusions of the fourth part is greater than 1 g/liter of substrate.

According to a third embodiment of this invention, for a proportion by volume PV of resilient particles $P_{>100}$ of between 5% and 60%, the quantity $D_F$ of fine fibres is greater than 1 g/liter of substrate, and the sum of the quantity $D_F$ of fine fibres and of the quantity $D_{AI}$ of all the other inclusions of the fourth part is less than 80 g/liter of substrate.

According to a fourth embodiment of this invention, for a proportion by volume PV of resilient particles $P_{R>100}$ greater than 60%, the sum of the quantity $D_F$ of the fine fibres and of the quantity $D_{AI}$ of all the other inclusions of the fourth part is between 7 g/liter of substrate and 40 g/liter of substrate.

According to a fifth embodiment of this invention, for a proportion by volume PV of resilient particles $P_{R>100}$ of less than 60%, the sum of the quantity $D_F$ of the fine fibres and of the quantity $D_{AI}$ of all the other inclusions of the fourth part is between 2 g/liter of substrate and 80 g/liter of substrate According to a sixth embodiment of this invention, for a proportion by volume PV of resilient particles $P_{R>100}$ greater than 60%, the sum of the quantity $D_F$ of the fine fibres and of the quantity $D_{AI}$ of all the other inclusions of the fourth part is between 5 g/liter of substrate and 200 g/liter of substrate.

Advantageously, the hard particles of the first part are grains of silica sand.

Preferably, the resilient particles PR of the first part are grains of cork.

Advantageously, the particulate elements of the second part are constituted of clay, of loam, of sand whose granulometry is less than 100 μm, of organic matter, of fine porous elements such as zeolite powder, coral or of diatomaceous earth.

Preferably, the particulate elements of the second part having a dimension of less than 20 μm represent less than 60 g/l of substrate and the particulate elements having a dimension of less than 100 μm represent less than 300 g/l of substrate.

According to one variant embodiment, the particulate elements of the second part having a dimension of less than 80 μm represent less than 45 g/l of substrate.

Advantageously, the fine fibres of the third part are hollow polyester fibres with a diameter of between 10 μm and 20 μm.

Preferably, at least 20% of the fibres of the third part are encased in a water-repellent lubricant product, such as for example silicone.

Advantageously, more than 50% of the weight of the fine fibres of the third part is constituted by fine fibres whose diameter is less than 10% of the mean granulometry of the hard particles of this substrate.

Preferably, the proportion by volume PV of the resilient particles $P_{R>100}$ in the substrate is more than 5% and less than 60%, and more than 50% of the weight of the fine fibres of the third part is constituted by fine fibres with a diameter of less than 10% of the mean granulometry of the hard particles.

When the hard particles are grains of sand, firstly, more than 80% by weight of these grains have a granulometry of between 200 μm and 400 μm, and, secondly, the fine fibres of the third part are hollow polyester fibres, with a diameter of between 12 and 30 μm and siliconised on the surface.

A substrate according to this invention enables the realisation, optionally in situ, of sports surfaces, of terraced surfaces, of a medium for the transplantation of vegetables or for growing turf in strips.

According to a preferred embodiment, the sports surface is constituted by juxtaposed cells, bounded by walls, and filled with substrate to a height at least equal to that of these walls.

The following description, which is by no means limitative, will enable a person skilled in the art to understand better not only the advantages of this invention, but also its implementation and its applications.

A substrate according to this invention intended for use as culture medium, in particular for turf, comprises:

a first part, constituting the skeleton of the substrate and representing more than 70% of the total volume of the substrate, composed of particles $P_{>100}$ with a granulometry of more than 100 μm, all of these particles being constituted of hard particles $P_{D>100}$ and/or resilient particles $P_{R>100}$, these resilient particles $P_{R>100}$ constituting a proportion by volume PV of between 0% and 100% by volume of this first part;

a second part of particulate elements $P_{>100}$ smaller than 100 μm, this part constituting 0 to 450 grams per liter of the substrate;

a third part, constituting from 0 to 200 grams per liter of the substrate, composed of fine fibres with a length between 3 mm and 100 mm and a diameter of between 5 μm and 35 μm;

a fourth part, constituting from 0 to 200 grams per liter of the substrate, composed of other elongated and/or surface inclusions, each of these elongated or surface inclusions having at least one of their dimensions a great deal larger than the granulometry of the particles of the first part, and the sum of the doses of the third part and of the fourth part being more than 3 grams per liter of the substrate.

It should be pointed out here that this invention must make it possible to meet the following various conditions:

the substrate must have a poral volume as large as possible of pores of large dimension corresponding to free water, which is achieved by means of particles of large size but at the same time with a reserve of usable water which is as large as possible, which is achieved by means of elements of small size and high surface tension;

fibres available in sufficient quantity and at a price compatible with the application;

fibres which satisfy the requirements of the principle of precaution in terms of risk to health in case of inhalation of micro-fibres;

fibres which contribute, if necessary, to increasing the reserve of capillary water available for the sprouting then the growth of the turf or plants cultivated in the substrate.

It has been shown, in surprising fashion, that it is possible to obtain a soil compatible with the culture of the turf, which is relatively satisfactory in terms of cleanliness and very satisfactory for a soil in which the level of particles with a granulometry of less than 20 μm is less than 60 grams/liter of substrate and in which the level of particles with a granulometry of less than 100 μm is less than 300 grams/liter of substrate: the surface thus obtained is relatively permeable.

According to another embodiment of the invention, the particulate elements of the second part are selected to have a dimension of less than 80 μm, representing less than 45 g/l of substrate: the surface thus obtained is highly permeable.

To respect the principle of precaution, and so as not to present any risk to the health of persons who have to handle them in order to produce the substrate and throughout the life cycle of the substrate, it is known that a diameter of microfibre of over 3 microns is considered to be the maximum diameter which can be inhaled, and that a diameter of 6 microns is the diameter above which the current legislation does not class fibres as a function of a potential risk to health: it was considered preferable to use a diameter of 10 microns in order to retain a large safety margin. Consideration has been given, not only to the dimension of the fibres which are incorporated, but also to what happens to them over time and how they may or may not decompose into finer fibrils. In this respect, known fibres, made of polyester, cannot decompose into smaller fibres due to their method of fabrication and are recognised as harmless to the environment and to health: they allow the principle of precaution to be respected. Polyester fibres with a diameter of more than 10 μm are compatible with these safety measures and are currently available on the market. A prudent minimum diameter of 10 μm corresponds to a hollow polyester fibre with a titre of 1.15 dtex and a minimum diameter of 6 μm corresponds to a titre of 0.4 dtex.

There are two possibilities envisaged to allow a fibre to move before becoming taut in a poral network during a shearing movement:

either the grains are in rigid sand, in which case it is necessary for the cross-sectional diameter of the fibre to be smaller than the diameter of the hole between three contiguous grains in the plane formed by the centre of these three grains (like the thread which passes through the eye of a needle): if a fibre has a diameter of more than ⅕ of the diameter of three contiguous grains, these grains must move aside in order to allow the fibre to pass without crushing it and so there is no degree of freedom for the fibre in these conditions;

or the grains between which the fibre coils up are resilient grains and in particular if these are grains of cork: the condition of the dimension of the fibre in relation to the dimension of the grain of cork is not necessary insofar as the fibre, by resting on the resilient grain, will crush the latter without opposing the shearing movement and the whole will resume its position after the strain.

However, since the granulometry of the substrates according to the invention is not homometric and since a fibre, which is very long in relation to the dimension of a grain of sand, passes through a great many pores on its path and since the diameter of the fibre must allow it to avoid being "caught" too often on its path, there has to be a large difference in diameter between the passage delimited by three grains and the diameter of a fibre (to clarify, a fibre 3 cm long corresponds to 100 times the dimension of a grain of sand of 300 μm). This depends not only on the diameter of the fibre, but also on its flexibility (which increases when the diameter diminishes) and its lubrication and of course on the statistical distribution of the dimensions of the passages in the porous volume as a function of the granulometric distribution of the sand; while it may be easy to give a diameter in a homometric medium beyond which it is known that the fibre is jammed, it is not easy to determine theoretically a diameter below which the fibre will slide in the porous volume before becoming taut and blocking any movement.

Tests which have been conducted have shown that, surprisingly, it is possible to obtain a satisfactory macroscopic effect when at least 50% of the fibres have a diameter of less than D50/10, and very satisfactory for a diameter of under D50/20, D50 being the maximum grain diameter of 50% of the grains of sand of the substrate, i.e. all the hard particles with a dimension of under D50 represent half the weight of all the hard particles: in other words, more than 50% of the weight of the fine fibres of the third part is constituted by fine fibres whose diameter is less than 10% of the mean granulometry of the hard particles. This condition is particularly advantageous when the proportion by volume PV of the resilient particles $P_{R>100}$ in the substrate is more than 5% and less than 60%.

For the aspect of flexibility and for the effectiveness of blocking of the fibre, it is preferable to have a diameter as small as possible; but the longer the fibre, the harder it is to retain flexibility, and the easier it is to engage the substrate, the harder it is to incorporate the fibre into the substrate.

Noticeable effectiveness commences at a length of fibre of 5 mm but it is preferable to have a length of more than 20 mm and the results improve when the length of fibre increases. A fibre of 60 mm is very effective and it would be desirable to have lengths of fibres of up to 100 or 200 mm or perhaps even more, but in recently-conducted tests there has been no success in incorporating them, because it becomes harder and harder to incorporate fibres as length increases.

Other tests have shown, surprisingly, that a satisfactory macroscopic effect can be obtained for a fibre of a diameter of less than D30/10 and very satisfactory for a diameter of less than D30/20, D30 being the maximum diameter of grain of 30% by weight of the hard grains of the substrate.

Preferably, a small diameter of fibre is better in order to obtain both better blocking and greater flexibility; but it has been found that the smaller the diameter, the harder it is to separate the fibres from each other and to mix them in the substrate, which causes the effectiveness of the fibres to be reduced.

Taking these factors into account, experience shows that a satisfactory result is obtained in a sand with a granulometry of between 200 μm and 1000 μm for a hollow polyester fibre of a diameter between 12 and 30 μm, corresponding to a titre of between 1.6 dtex and 34 dtex.

Siliconised fibres have the advantage of "sliding" better in the porous volume of the sand with the aid of a "sleeve" of droplets resulting from the water-repelling property induced by the coating of silicone: this is a positive effect for the flexibility of the substrate for a given diameter of fibre. Conversely, however, by sliding more easily, they are less effective for this reason in maintaining the sand.

So it is preferable only to use siliconised fibres when the fibres are long, preferably for fibres longer than 3 cm.

Moreover, siliconised fibre does not retain water by capillary action and the fact of using such a siliconised fibre would thus in principle reduce the water holding capacity.

And yet, quite the contrary, it has surprisingly emerged that using water-repellent fibres such as siliconised fibres is an extremely effective means of retaining water in the porous volume when the diameter of the drop of water on the water-repellent surface of the fibre is greater than the dimension of the passage between three grains of sand less the diameter of the fibre, because the water, which enters this cavity and recombines into a large drop due to the water-repelling property of the fibre, can no longer come out again by the passage taken by the fibre.

In practice, it has been found, surprisingly, that a water-repellent fibre, for example a siliconised fibre, in a sand whose D50 is less than 500 µm, gives the substrate a hydric behaviour which is especially favourable to the development of the turf.

Thus, a siliconised fibre in a sand of D50<500 µm and more particularly in a sand of D50<350 µm, exhibits the double benefit of a lubrication enabling the fibre to be incorporated into the porous volume of said sand, this incorporation being more difficult as the sand becomes finer and creating a completely new synergy between a porous volume of hydrophilic granules and a fibre with a water-repellent surface to trap water in the porous volume, this water being very easily usable by the roots of plants growing in the substrate.

Taking these factors into account, experience shows that an especially satisfactory result is obtained, both in mechanical terms and with respect to the growth of the turf, taking account of the good water holding capacity and good capillary action in a sand with a granulometry of between 200 µm and 400 µm and for a siliconised hollow polyester fibre with a diameter of between 12 and 30 µm.

Experience shows that even better results are obtained with a non-siliconised fibre, but that it is more difficult to incorporate it well and that effectiveness falls if it is not properly incorporated. For lengths of fibres of less than 80 mm, however, the choice of non-siliconised fibres is an attractive possibility if one has access to especially effective means of incorporation.

It is also possible to use polyester fibre produced from industrial recycling with cotton fabric.

It is possible to leave out the cotton, which plays no important positive mechanical role, still less a durable positive mechanical role, since it is biodegradable. But it has emerged, surprisingly, that cotton, being extremely hydrophilic, delivers a very attractive reserve of water at the start of the life of the substrate, at the crucial moment of the implantation of the turf by seeding or of implantation of the plants on a terrace or, again, for the transplantation of large trees.

By the same token, it has surprisingly emerged that fibres, which are not individualised, are less effective for the role initially planned, consisting of mechanically reinforcing the substrate. But these non-individualised fibres, which have appeared unexpectedly in the process of fabrication in the form of small unattractive clumps, have turned out to be useful in giving a sort of structure to the substrate which resembles the structuring of clods in a natural soil.

If the fibres are hydrophilic, but also, more unexpectedly, if they are not hydrophilic but siliconised, the clumps have, surprisingly, turned out to be highly effective in creating usable reserves of water in which the young rootlets primarily gather during seeding; and, what is more, it has unexpectedly emerged that these clumps effectively oppose the penetration of a crampon for example, just as chignons of hair protected warriors by preventing a sabre, even if sharpened, from cutting their necks. It has also been realised, unexpectedly, that these clumps occupy a large volume, which is liable to shrink in on itself and to regain its volume: finally, they constitute a sort of light, insulating, aerated particle, with a high reserve of water and resilient.

Too many, however, of these clumps, or surface elements, in addition to being especially unattractive on the surface, in particular render it extremely difficult to put the substrate in position and to level out the surface; and, what is more, they may end up reducing the cohesion of the whole if continuous sliding surfaces can form from one clump to another. In addition to having a mechanical effectiveness which is almost nil in comparison with that of individualised fibres, these fibres in clods, if they are more numerous than necessary, increase the price of the substrate with no mechanical advantage.

That is why, according to this invention, the quantity of these surface elements must not represent more than 75% of the quantity $(D_F+D_{AI})$ of all the inclusions of the third and fourth parts.

Surprisingly, it has been realised that the maximum dose of fibres which can be mixed into the substrate is very considerably greater if the substrate contains a predominant proportion of cork or of matter which is resilient by comparison with sand; and, it has also been realised, even more surprisingly, that it is possible to constitute a substrate in which cork constitutes the essential part, sand being either absent, or very much in the minority in terms of quantity by volume (for example a dose of sand of under 30%): this cork-based substrate is, against all expectations, for the same quantity of fibres, even more resistant to shearing than a substrate essentially composed of sand.

So it has been realised, completely unexpectedly, that a substrate essentially constituted of cork may allow a much higher dose of fibre, due to the fact that the fibre does not jam the machine which mixes the fibre and cork, by creating a shearing with the aid of the capacity for resilience of the cork, which collapses in on itself, in order to pass through where sand would be blocked in the process of fabrication.

In such a mixture, according to the invention, with the aid of grains of cork which keep the fibres separate (which would otherwise agglomerate and become compacted), these constitute, in a mixture with cork, and for the same reasons as this latter, a fully integrated constituent of the substrate, light, insulating, resilient, capable of capillary water retention.

It has been found that, even more surprisingly, cork and fibre, partly in the form of clumps and partly in the form of individualised strands, optionally with a little sand, constitute an extraordinary matrix, which behaves like a soil with respect to plants but which behaves, at macroscopic scale, like a judo tatami, for example, i.e. like an elastic solid.

This substrate can be moulded and compressed to its equilibrium thickness and it is possible to walk or jump on its edge without destroying it: the edge may be compressed by several centimeters locally under the weight and immediately returns to its place.

The lower the portion of sand and the higher the proportion of resilient grain, particularly of cork, the lower the density of the substrate and the higher its coefficient of insulation.

For a substrate in which cork represents more than 50% by volume, the mechanical characteristics of the substrate are hardly affected at all by frost. It has even been found that turf planted in a substrate according to this invention with a proportion of cork of over 75% remains resilient, while other soils are frozen and as hard as rock.

For a substrate of this type according to the invention, in which cork in the form of large granules represents over 20% and preferably over 50%, and in which the sandy proportion has a D10 of over 200 μm, permeability is such that the substrate "drinks deep" and at the end of the worst precipitations holds only the water retained by capillary action.

The combination of water retained by capillary action and of thermal insulation enables a reserve of water to be kept available for seeding for a very long time and up to the surface.

A substrate according to this invention can be characterised, whatever its formulation, as follows:
firstly by the initial proportion by volume of each component of the mixture, with the exception of the fibres, defined as the heaped volume of the component before its incorporation divided by the sum of the heaped volumes of all the components before their incorporation (with the exception of the fibres); and,
secondly by a gravimetric density of the fibre in the mixture defined as the weight of the fibre divided by the sum of the heaped volumes of all the components before their incorporation in the mixture, with the exception of the fibres.

Usually, when analysing soil, one considers in a mixture the proportions by weight (as dry weight) of the different fractions, because the dry weight of the mixture is equal to the sum of the dry weights of the constituents while the volume of a mixture is not necessarily equal to the sum of the initial volumes of the constituents, because of the swelling or compaction of the mixture, as small particles can "disappear" in the porous volume of the large particles.

In practical terms, however, for the constituents other than fibre, to characterise the substrate, one uses the initial proportions by volume as defined above, so that the sum of the initial proportions by volume of all of the constituents does in fact make 100%.

The advantage within the frame of this invention of expressing the composition of the substrate as initial proportions by volume is threefold:
firstly, the constituents used are selected to be non-swelling, which indicates that the volume of the heap of each constituent remains the same, whether the constituent is wet or dry, while the weight of the heap changes considerably as a function of the water content. The heaped volume, and not the heaped weight, is thus proportional to the dry weight of the element concerned.
secondly the process of dosing the sand and the cork, as practised in the frame of the invention, is done by the heaped volume and not by weight
finally, and above all, the densities of the constituents being very different from each other, since for example sand is 20 times denser than cork, a hypothetical initial proportion by volume of 75% of cork would give a proportion by weight of 15% of cork while ¾ of the volume is taken up by the cork and it is this occupation of space which means that the cork imposes its mechanical behaviour (density of the mixture, absorption capacity, resilience, thermal insulation, etc.) which is thus more closely linked to the initial proportion by volume than to the proportion by weight.

In another version of the dosing process, the servo module for the start of the sand is controlled as a function of the variation of the weight of sand in a hopper and one could express the ratio between the volume of cork and the weight of sand, but it is more meaningful to the person skilled in the art to consider the volume ratio between the cork and the sand; if the weight of the sand is known, it is sufficient to divide the weight by the density of sand even if this density is selected arbitrarily or superficially, to convert the weight of the sand into volume and arrive at the composition by volume with respect to the components of sand and of cork.

With respect to the fibres, on the other hand, the initial volume of the fibres is not used, because the volume of the same quantity of fibres may vary in a ratio of more than 10 as a function of the processing of these fibres, which may be heavily compressed and occupy a small volume or on the other hand, be loosely packed and take up a huge volume. For a given type of fibre, it is therefore the weight of fibre which is the most practical parameter for finding out the quantity of fibre incorporated.

A substrate according to this invention certainly has, as principal application, the realisation, optionally in situ, of sports surfaces, but also of terrace surfaces or a medium for the transplantation of vegetables or for growing turf in strips.

The improvement in the characteristics of flexibility, of reduced sensitivity to compaction and thermal insulation is detectable once the proportion by volume of the resilient particles in the substrate is more than 5% and the diameter of the fine fibres is less than 10% of the granulometry of the hard particles of the first part. This improvement is naturally accentuated as the proportion of resilient particles increases. But the concomitant increase in the cost price and the difficulty of conserving such good cohesion beyond 60% mean that formulas with more than 60% by volume of resilient elements tend to be reserved for culture substrates for terracing; the formulas for sports grounds preferably contain less than 60% by volume of resilient elements.

Taking into account these elements, the substrate according to the invention is available in several formulations which are very different as a function of their applications.

Several elements allow the formulation to be identified as a function of needs.

The cost price rises very significantly with the increase in the proportion by volume PV of cork, which is a first element to limit the use of cork for economic reasons. Moreover, although cork provides flexibility, depending on their intended use, it is necessary for fields to retain a certain performance and sufficient bounce: the field is faster for racing or for the ball when it is harder; for example, it is necessary to have sufficient bounce for the ball when playing football or tennis: this is one reason to limit the use of cork on technical grounds.

Over a period of one year, experiments were carried out to improve the product and test the formulations.

To improve the product, different sources of fibres were sought and it was realised that totally different results were obtained in terms of mechanical behaviour with fibres which were only slightly different and moreover with formulations which were exactly equivalent.

The thickness of the fibres is an important element, just as surface condition and length have proven to be decisive. If the fibres, all else being equal, are too short in relation to the dimension of the grains, the stabilisation effect is very weak, sometimes even non-existent; the more the length increases, the more effective the fibres, for the same quantity of fibres, on condition they can be kept untangled, which is more and more difficult when the length increases.

In order to improve the formulation and to incorporate fibres which were as effective as possible, it was necessary to improve the defibration system, which is intended to separate the fibres, to keep them separated and to introduce them into the granular medium well separated, at the strategic meeting point arranged in the mixing process.

Taking these improvements into account, it was possible to test numerous formulations with fibres which had been well defibred by installing them on a grid pattern and then testing the mechanical behaviour of different formulations obtained, for different types of fibres, by varying the concentration of fibres according to one axis of the grid pattern and the concentration of cork according to the other axis.

In particular, tests were carried out with lengths of fibres of 40 mm, which proved effective but too short for good effectiveness, fibres of 70 mm which proved to be very effective in obtaining a resilient and stable substrate, and 140 mm, which proved to be even more effective, especially with the most corky substrates.

For preference, it was found that the other elongated or surface inclusions which can be added to fibres to stabilise the substrate are more effective if their largest dimension is at least 10 times greater than their smallest dimension and at least 10 times greater than the mean granulometry of the particles constituting the skeleton of the substrate.

In the examples studied, it was necessary to choose a description of the mixtures, taking into account what can be measured and the ratios between the density of the cork and that of the sand. A process of formulation and automation of the fabrication of the mixtures has been perfected, characterised in that there are three distribution devices whose flow can be regulated, a sand distributor, a cork distributor and a fibre distributor and the different flows are regulated in order to obtain a formulation equal to the proportion of distribution flows of the elementary components.

In this process, the flow of sand is characterised by the measured weight of sand transiting per unit of time, while the flow of cork is characterised by the measured volume of cork passing per unit of time and the flow of fibres is characterised by the weight of fibres passing per unit of time.

It was decided to characterise the granular medium by the proportion of the respective volumes of sand and of cork, but a difficulty arises for the sand, whose volume depends on the state of compaction, and whose weight is not known.

Taking into account the uncertainties of weight due to the water attached to the sand, the weight of wet sand passing per unit of time is measured and in the fabrication and evaluation process an arbitrary volume of sand, calculated on the basis of its weight, is taken into account, deciding arbitrarily that the "arbitrary volume" of sand is that which corresponds to the measured weight, for a selected arbitrary density, for example 1.4 kg/liter of sand; the proportion by volume between the sand and the cork is then characterised by considering that the proportion of sand is the ratio between the arbitrary volume of sand and the sum of the arbitrary volume of sand and of the measured volume of cork, the sum of the proportions by volume of sand and of cork being equal to 100%.

The quantity of the fibres is considered in grams per liter of mixture: one considers per unit of time the ratio between the weight of fibre added and the arbitrary volume of the mixture equal to the sum of the arbitrary volume of sand and of the measured volume of cork in the same unit of time.

What is referred to as the weight of fibre in relation to the volume of the mixture is in fact the ratio between the weight of fibres added and the arbitrary volume of aggregates defined by the sum of the arbitrary volume of sand and of measured volume of cork.

The perfected process is then characterised by the fact that firstly the flow of sand can be regulated and measured continuously by measuring the variation in weight of a sand circulation system, for example by mounting this system on precision scales and by the fact that secondly there is a computer program to automate these flows, enabling the flows of cork and of fibre to be automatically linked to this measurement of the flow of sand as a function of the formulation required and also to continuously accelerate or to decelerate the flow of sand in order to keep it at its planned flow rate, despite any flow irregularities linked to irregularities of internal friction within the circuit.

Taking into account the progress already made, firstly in terms of defibrage, secondly of choice of fibres, and lastly of precision of mixtures, it has been possible to test numerous formulations systematically. Surprisingly, the results are very noticeably different from the results originally obtained using less suitable fibres, less well defibred and mixed with less precision.

Surprisingly, the progress made in the choice of fibres and the method of defibrage completely overturned the results previously obtained, as shown by the following examples of some tests.

Many tests were carried out on the different mixtures and relate to the mechanical aspect, the agronomical and hydric aspect and to the adaptation of the product to different uses.

In particular, accelerometric tests enable the elasticity and the modes of dissipation of kinetic energy to be tested, while other tests allow the cohesion and the angle of internal friction of the substrate to be measured.

The disadvantage of these tests is that they give measurements which characterise the substrate, but without providing any threshold of effectiveness, whether this is a minimum or a maximum threshold.

We were able to define, in addition to scientific measurements of characterisation, a very simple qualitative test for a minimum threshold of effectiveness, and which seems pertinent to us because it is simple to carry out, discriminating and reproducible, and correlated to the required stability objective. This test consists, for a given substrate, of spreading it out over a low height and a small surface area, compacting it and then attempting to sink a spade into it: for a quantity of fibres of less than a certain quantity which defines the threshold of effectiveness revealed by this test, it is possible to sink the spade, while above this quantity, it becomes very difficult, then impossible to do so, as soon as this threshold of effectiveness is slightly exceeded; although completely dependant on the methodology of compacting and the humidity or the way in which the spade is sunk, this test, realised in summary fashion by compacting with the feet, turned out to be completely reproducible, even if it involves no great precision and it has therefore been used in order to determine the minimum threshold of fibres to incorporate into the different granular mixtures tested.

These tests revealed a sensitivity to fibres for low quantities but with a minimum quantity which increases with the quantity of fibres.

It was observed that it was preferable to have at least 0.5 g/l of fibres to observe any effect of the fibres.

It is preferable to have at least 0.5 g/l of fibres and at least 1 g/liter of the sum of fibres plus inclusions to obtain a visible result with a dose of cork greater than 5% and less than 60%.

It is preferable to have at least 1 g/l of fibres and at least 2 g/liter of the sum of fibres plus inclusions to obtain a visible result with a dose of cork of more than 60%.

Preferably, maximum effectiveness is obtained for a substrate having a dose of cork of less than 60% for a quantity of fibres plus elongated or surface inclusions of between 2 g/liter and 80 g/liter.

Preferably, maximum effectiveness is obtained for a substrate having a dose of cork of more than 60% for a quantity of fibres plus elongated or surface inclusions of between 5 g/liter and 200 g/liter.

With respect to the maximum threshold of fibre utilisable in a mixture, it has not been possible to find an objective test for the minimum threshold and it is necessary, in order to determine the preferred maximum dose of non-intrinsic criteria which are, essentially, the possibility and the benefit of putting more fibres into each granular mixture.

It has become evident that the more cork there is and the more it is possible to integrate large quantities of fibres without "jamming" the mixing machine, the more useful it is to add more of them to stabilise the mixture.

The drawbacks of adding too much are:
firstly the difficulty of incorporating the fibre without jamming the mixing machine
and the difficulty of keeping a mixture which is homogeneous and compacts well,
then the increase in the cost of material
and the reduction in the rate of fabrication,
then the difficulty of spreading out the mixture and keeping it flat
and finally the increased difficulty of then avoiding the segregation of surplus and badly mixed fibres.

In general, however, tests have not revealed any obvious intrinsic material drawback for too high a quantity of fibres, once they have been successfully incorporated; by improving the production equipment, it has been possible to mix very much larger doses than had previously been imagined, without reaching a quantity which presents a behavioural defect, even if, when the dose of fibres increases too much:
the substrate becomes more and more difficult to put into position,
the substrate becomes more and more difficult to compact,
the substrate needs more and more water and mechanical force to become compacted,
the substrate becomes more and more desiccated,
the substrate becomes more and more subject to segregation as it dries, with fibres detaching over time on the surface of the substrate,
the substrate has degraded agronomic characteristics.

It is found that beyond a certain quantity the substrate no longer presents itself as a granular matrix with fibres running around the grains and separated from each other by these grains, but changes continuously to become a fibrous matrix in which are incorporated the aggregates which are attached to the fibres by electrostatic forces or hydraulic cohesion and which continues to present itself as a culture substrate but with continuously altered density characteristics, and is less attractive for economic reasons.

In view of these new tests, therefore, it appears that there is no test for a maximum threshold as there is a minimum threshold test, but the simple finding is that there is a progressive reduction in the benefit of increasing the quantity of fibres, both economically and technically. Taking these new observations into account, no test has allowed the setting of an intrinsic maximum threshold which must not be exceeded, even if the economic considerations or the difficulties of fabrication as things stand or again, the lack of any advantage observed in increasing the quantity of fibres beyond a certain limit, allow a preferred maximum quantity to be set for the different tests carried out.

So it is not necessary to set a maximum quantity, even though it is desirable, for preference, not to exceed a maximum quantity for use as a sports surface, and particularly for quantities with a high sand content, because:

firstly, beyond a certain threshold, the soil becomes more and more difficult to level when the dose of fibres increases,
and because, secondly, the price increases (price of the fibre and mixing time) without any significant advantage in terms of stabilisation having been observed in return.

For a quantity of cork of less than 60%, it is preferable to have a quantity of fibres of less than 80 g/liter.

Above 60% of cork and most particularly above 75% and up to 100% of cork, it was realised, with new tests conducted, firstly, for use as a turf substrate for a car park or for roads suitable for motor vehicles and secondly as a light substrate for terrace cultivation, that these uses make a high quantity of fibres attractive, but with the intrinsic maximum limits which became apparent.

In the case of terraces, the preferred quantities of cork lie between 60% and 95% (substrates of 100% cork were used, but the substrate has less hold and there is a high segregation of fibres at above 90%).

When it was attempted to increase the quantity of fibres above 200 $g/m^3$ for quantities of cork of 95%, it was found that it was more useful to add 5% of sand and to arrive at a substrate which was 90% cork and 10% sand than to add 70 $g/m^3$ of fibres because it is more or less equivalent in terms of density of substrate compacted to the maximum, but with a sandy substrate which compacts better and then holds in position, while the increase in the weight of fibres increases the density of the substrate but at the same time gives a substrate which compacts less well and holds less well, at a much higher cost.

The preferred maximum quantity for a proportion of cork of over 60% is 300 g/liter.

In the case of car parks or roadways, it emerged first of all that the increase in the proportion of cork benefits friction and the anti-shearing effect but that a minimum density of sand is useful for the action-reaction principle and the preferred quantity of cork lies between 40 and 70%.

It then emerged, in the same way, that the density of fibres must be as high as possible to create a maximum of links and the greatest possible anti-shearing effect but that its increase comes up against the drawback that the surface no longer remains compact enough because water is necessary to compact the volume, but that by drying out, there is renewed proliferation and destabilisation.

It has also turned out to be preferable not to exceed an arbitrary quantity of 300 g/liter of aggregate.

For a football pitch, it is preferable to keep to a formulation which is very low in cork at the low end of the range for economic reasons; but it is preferable to have between 5% and 20% of cork to improve flexibility; for top of the range pitches, it is preferable to have between 20 and 40% of cork, with a quantity of fibres of between 7 and 15% for pitches for normally intensive use and up to 20 g/l for heavily used training pitches. For the ball to bounce adequately, there must not be more than 60% of cork and to keep a fast pitch while improving flexibility for players, it seems that 40% of cork is a good compromise.

For a golf green, the attraction of a substrate according to the invention is to allow a dense surface which remains aerated, supportive and hard, and suitably decompacted for growing the turf, with an easily usable and sufficient reserve of water. To make the green faster, i.e. the speed of the ball on the green, which is generally desirable, the proportion of cork must be reduced, but the other aspect is to have greens with a speed similar to other golf greens, so that the proportion of cork will preferably lie between 10% and 40%, depending on whether the aim is the performance of the green in question or homogeneity in relation to other existing greens.

In the same way, for tennis, the quantity of cork has an influence over the type of play; by increasing the proportion of cork, greater comfort is achieved, but the bounce is not so high and the speed of bounce is lower, which is similar to the surface behaviour of that of a copiously watered clay, while a substrate according to the invention, with a low proportion of cork, will make it possible to obtain a surface similar to that of a turf made of grass on dry earth. Depending on the objectives, the preferred proportion of cork will be from 0 to 20% for a very fast surface, between 20% and 40% for a soft and slower surface of the clay type and up to 60% for a very soft surface with slow play, suitable for tennis played for pleasure rather than for competition.

For a rugby pitch, flexibility and resistance are more important than the bounce of the ball and the best compromise lies, in technical terms, between 40 and 60% of cork with 15 to 20 g/liter of substrate or between 20% and 40% of cork with 10 to 15 g/liter of fibres for a lower budget training pitch.

Football and rugby pitches may have a layer of substrate according to the invention which is 10 to 15 cm thick or a layer of substrate according to the invention of 3 to 7 cm as surface, resting on a sub-layer of sand of at least equal permeability.

At a time when there are concerns about both sustainable development and about heating pitches so they can be used for sports in winter, cork presents one great advantage by its isothermal nature: for this reason, it gives soil the ability to tolerate more intense cold without freezing and to remain warm enough for longer to allow turf to sprout or grow; in addition to this isothermal nature, the resilient aspect of cork allows the soil to take up any expansion of water between 4° C. and 0° C. when water turns into ice: so the soil does not become hard and solid if the water present in the substrate turns into ice, all the more so since the substrate according to the invention has very high permeability and retains only a small quantity of water by capillary action; most of the water present in the porous volume being very rapidly evacuated by gravity if the substrate is placed, as it should be, on a surface with adequate drainage.

So substrates according to the invention enable the creation of a sports field which can be used in winter without heating, while other fields are as hard as rock and also, if heating of the substrate is installed, enables a higher temperature to be achieved for much less energy consumption. Tests conducted have shown that, for the same heating energy distributed in the same way at the same time, the substrate according to the invention tested had a temperature 10° C. higher than that of the reference substrate.

As for horse racing tracks, there is a need for soils which are at the same time much more resilient, because horses tend to run on wet grass in which their hooves sink by several centimeters, and very resistant in order to avoid having to replace clods, as is currently the case, this work representing a very high cost. For this reason, the desirable formulations comprise a minimal proportion of cork, of between 40 and 60%, and preferably an even higher proportion, between 60 and 80%, most particularly in the most sensitive areas such as approaches to jumps, the thicknesses of such a substrate being at least between 15 and 20 cm.

For show jumping arenas, these have to be resilient, but not too much so, and above all must release energy: a proportion of between 10% and 40% of cork would be suitable in technical terms.

Polo fields or trotting tracks must be even harder and the proportion of cork may advantageously lie between 5% and 20%.

When the sports field or surface is constituted by juxtaposed cells, bounded by walls, these are filled with a substrate according to the present invention to a height at least equal to that of these walls.

When the level of the substrate exceeds the level of these walls by a few centimeters, the preferred substrate is a substrate comprising more than 50% cork, because the lower density of the substrate and its behaviour as an elastic solid allows vertical edges going beyond the level of the walls and the playing surface to have good hold, while guaranteeing the flexibility of the substrate.

The invention claimed is:

1. A substrate intended for use as a culture medium, the substrate comprising:
    (i) a skeleton of said substrate and representing more than 70% of a total volume of said substrate, said skeleton being composed of particles with a granulometry greater than 100 µm, said particles being selected from the group consisting of hard particles, resilient particles and any mixture thereof;
    (ii) particulate elements with a granulometry of less than 100 µm, said particulate elements constituting from 0 to 450 g/l of said substrate;
    (iii) fine fibres with a length of between 3 mm and 100 mm and a diameter of between 5 µm and 35 µm, said fine fibres constituting from 0 to 200 g/l of said substrate; and
    (iv) inclusions selected from elongated inclusions, surface inclusions and a mixture thereof, said inclusions having their largest dimension at least 10 times greater than their smallest dimension and at least 10 times greater than a mean granulometry of said particles of said skeleton of the substrate,
    a total quantity of said fine fibres and said inclusions being greater than 0.5 g/l of said substrate.

2. The substrate according to claim 1, wherein all the particles with a dimension greater than 180 µm and particles with a dimension less than 100 µm represent together less than 1000 g/l of said substrate.

3. The substrate according to claim 1, wherein for a proportion by volume of resilient particles of less than 5% of the particles of said skeleton, the total quantity of said fine fibres and said inclusions is greater than 0.5 g/liter of said substrate and less than 20 g/liter of said substrate.

4. The substrate according to claim 1, wherein, firstly, more than 80% by weight of the hard particles present a granulometry of between 200 µm and 400 µm, and that, secondly, said fine fibres are fine fibres, with a diameter of between 12 µm and 30 µm.

5. An application of the substrate according to claim 1 to the creation of sports surfaces, of terrace surfaces, of a medium for the transplantation of vegetables or for growing turf in strips.

6. The application according to claim 5, wherein the sports surface is constituted by juxtaposed cells, bounded by walls, and filled with said substrate to a height at least equal to that of said walls.

7. The substrate according to claim 1, wherein the resilient particles represent 5% to 100% by volume of the particles of said skeleton.

8. The substrate according to claim 1, wherein baked cork grains represent 5% to 100% by volume of the particles of said skeleton.

9. The substrate according to claim 1, wherein at least 20% by weight of said fine fibres are hollow polyester fibres with a diameter of between 10 µm and 30 µm.

10. The substrate according to claim 8, wherein at least 20% by weight of said fine fibres are hollow polyester fibres with a diameter of between 10 μm and 30 μm.

11. The substrate according to claim 7, wherein for a proportion by volume of resilient particles greater than 5% and the total quantity of said fine fibres and said inclusions is greater than 1 g/liter of said substrate.

12. The substrate according to claim 7, wherein for a proportion by volume of resilient particles of between 5% and 60%, the quantity of said fine fibres is greater than 1 g/liter of substrate, and the total quantity of said fine fibres and said inclusions is less than 80 g/liter of said substrate.

13. The substrate according to claim 7, wherein for a proportion by volume of resilient particles greater than 60%, the total quantity of said fine fibres and said inclusions is between 7 g/liter of said substrate and 40 g/liter of said substrate.

14. The substrate according to claim 7, wherein for a proportion by volume of resilient particles of less than 60%, the total quantity of said fine fibres and said inclusions is between 2 g/liter of said substrate and 80 g/liter of said substrate.

15. The substrate according to claim 7, wherein for a proportion by volume of resilient particles greater than 60%, the total quantity of said fine fibres and said inclusions is between 5 g/liter of substrate and 200 g/liter of substrate.

16. The substrate according to claim 7, wherein said hard particles of said skeleton are grains of silica sand.

17. The substrate according to claim 16, wherein said particulate elements are selected from the group consisting of clay, loam, very fine sand with a granulometry of less than 100 μm, organic matter, fine porous elements, zeolite powder, coral, diatomaceous earth and any mixture thereof.

18. The substrate according to claim 15, wherein particulate elements having a dimension of less than 20 μm represent less than 60 g/l of said substrate and particulate elements having a dimension of less than 100 μm represent less than 300 g/l of said substrate.

19. The substrate according to claim 18, wherein the particulate elements having a dimension of less than 80 μm represent less than 45 g/l of said substrate.

20. The substrate according to claim 9, wherein at least 20% by weight of said fine fibres are encased in a lubricant water-repellent product.

21. The substrate according to claim 20, wherein said lubricant water-repellent product is silicone.

22. The substrate according to claim 7, wherein over 50% of the weight of said fine fibres is constituted by fine fibres whose diameter is less than 10% of the mean granulometry of the hard particles of said substrate.

23. The substrate according to claim 7, wherein the proportion by volume of said resilient particles in said substrate is greater than 5% and less than 60%, and that more than 50% of the weight of said fine fibres is constituted by fine fibres whose diameter is less than 10% of the mean granulometry of said hard particles.

24. The substrate according to claim 7, wherein baked cork grains represent between 20% and 60% of said particles of the first part.

25. The application according to claim 6, wherein said creation of sports surfaces, of terrace surfaces, of a medium for the transplantation of vegetables or for growing turf in strips, is performed in situ.

26. A football, soccer or rugby field comprising:
   a substrate, the substrate comprising:
   (i) a skeleton of said substrate and representing more than 70% of a total volume of said substrate, said skeleton being composed of particles with a granulometry greater than 100 μm, said particles being selected from the group consisting of hard particles, resilient particles and any mixture thereof;
   (ii) particulate elements with a granulometry of less than 100 μm, said particulate elements constituting from 0 to 450 g/l of said substrate;
   (iii) fine fibres with a length of between 3 mm and 100 mm and a diameter of between 5 μm and 35 μm, said fine fibres constituting from 0 to 200 g/l of said substrate; and
   (iv) inclusions selected from elongated inclusions, surface inclusions and a mixture thereof, said inclusions having their largest dimension at least 10 times greater than their smallest dimension and at least 10 times greater than a mean granulometry of said particles of said skeleton of the substrate,
   a total quantity of said fine fibres and said inclusions being greater than 0.5 g/l of said substrate; and
   wherein said resilient particles represent 5% to 100% by volume of said particles.

27. The football, soccer or rugby field according to claim 26, wherein said substrate forms of a layer of substrate resting on a sub-layer of sand of at least equal permeability.

* * * * *